United States Patent [19]

Boram

[11] Patent Number: 4,466,560
[45] Date of Patent: Aug. 21, 1984

[54] HAND TOOLS FOR DISPENSING PARTICULATE MATTER

[76] Inventor: Frank Boram, 1 Chaucer Dr., Milford-on-Sea, Hampshire, England

[21] Appl. No.: 424,511

[22] Filed: Sep. 27, 1982

[30] Foreign Application Priority Data

Oct. 17, 1981 [GB] United Kingdom ............... 8131368

[51] Int. Cl.³ .............................................. B65G 65/48
[52] U.S. Cl. ..................................... 222/196; 111/76; 222/564
[58] Field of Search ............... 222/161, 191, 192, 196, 222/201–204, 564, 575, 465, 544; 221/200, 311, 312 R; 111/72, 74–76, 92–95, 50

[56] References Cited

U.S. PATENT DOCUMENTS

| | | | |
|---|---|---|---|
| 1,383,281 | 7/1921 | Bailey | 222/196 |
| 2,525,641 | 10/1950 | Bouska | 222/161 |
| 2,732,974 | 1/1956 | Hedges | 221/312 R |
| 3,066,827 | 12/1962 | Pryor | 221/312 R |
| 4,120,428 | 10/1978 | Boram | 222/201 |

FOREIGN PATENT DOCUMENTS

| | | |
|---|---|---|
| 562464 | 7/1944 | United Kingdom . |
| 615270 | 1/1949 | United Kingdom . |
| 849547 | 9/1960 | United Kingdom . |
| 899792 | 6/1962 | United Kingdom . |
| 1116182 | 6/1968 | United Kingdom . |

Primary Examiner—Joseph J. Rolla
Assistant Examiner—Michael S. Huppert
Attorney, Agent, or Firm—Leydig, Voit, Osann, Mayer & Holt, Ltd.

[57] ABSTRACT

A hand tool for dispensing particulate matter such as seeds comprises a V-section scoop with a handle incorporating a vibrator mechanism. A labyrinth type barrier arrangement serves to contain a reservoir of seeds in the scoop and to permit controlled flow of the seeds from the reservoir when the tool is held at an angle and vibrations are applied. A barrier arrangement at the dispensing end portion of the scoop effects final separation of the seeds prior to discharge.

4 Claims, 3 Drawing Figures

HAND TOOLS FOR DISPENSING PARTICULATE MATTER

BACKGROUND OF THE INVENTION

1. Technical Field

The present invention relates to hand tools for dispensing particulate matter, for example seeds.

2. Prior Art

In my earlier British Patent Specification No. 1,578,529 there is disclosed a hand tool for dispensing seeds, comprising a V-section scoop which is vibrated mechanically or electro-mechanically to cause a batch of seeds within the scoop to be dispensed one at a time from the end of the scoop. A small barrier extends transversely across the bottom of the scoop at its discharge end portion and acts as a weir to facilitate the separation of the seeds which jump over the barrier when vibrations are applied. In practice it has been found that the barrier does operate satisfactorily provided that the scoop is held within a few degrees of a specific angle. If the scoop is held at too steep an angle there tends to be an uncontrolled flow of seeds.

In an attempt to overcome this problem a second barrier was placed upstream of the barrier at the dispensing end portion. This second barrier took the form of a transverse panel extending across the scoop with an opening provided at the apex of the barrier immediately adjacent the bottom of the scoop to define an aperture through which seeds held behind the barrier could pass singly.

This arrangement necessitated a different size of aperture for different sizes of seed and in order to enable the dispenser to handle a wide variety of seed sizes it was necessary to provide a series of interchangeable barrier panels each with a different size of aperture. Although functionally this arrangement worked satisfactorily, it did have the disadvantage that it was not always easy for the user to select the appropriate barrier and also there was the possibility that the user could mislay the barriers which were not in use.

BRIEF SUMMARY OF THE INVENTION

The present invention provides a hand tool for dispensing particulate matter including a scoop comprising a handle and a housing having a discharge end, a labyrinth barrier disposed across the housing defining an upstream reservoir in the housing for particulate matter and defining a labyrinth path for particulate matter from the reservoir to the discharge end of the housing, means for vibrating the contents of the reservoir, and means adjacent the discharge end of the scoop for separating the particulate matter prior to discharge.

DESCRIPTION OF THE DRAWINGS

The novel features of the invention will be apparent from the following description given by way of example only with reference to the accompanying diagrammatic drawings, in which.

DESCRIPTION OF PREFERRED EMBODIMENTS

Figure 1:
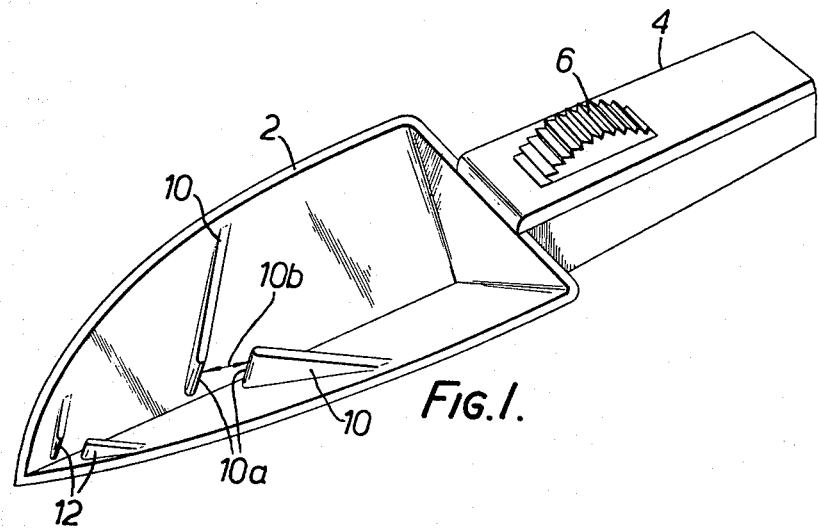
FIG. 1 is a perspective view of a first embodiment of a seed dispenser in accordance with the present invention.

The seed dispenser shown in FIG. 1 comprises a V-section scoop 2 with an integral handle 4. The handle 4 incorporates a notched wheel 6 which cooperates with a spring strip (not shown) mounted within the handle 4 to produce the vibration necessary to effect dispensing of the seeds. Alternatively, the handle may incorporate an electro-mechanical vibrator mechanism. The basic construction of the dispenser so far described is identical with the dispenser described in British Patent Specification No. 1,578,529 to which reference may be made for further details particularly as regards the construction of the mechanical and electro-mechanical vibrator mechanisms.

In an intermediate portion along the length of the scoop 2 there is formed a barrier comprising two walls 10 which extend generally transversely to the longitudinal axis of the scoop. Each wall 10 extends inwardly from an outer part of the scoop to terminate either on or closely adjacent to a vertical longitudinal plane passing through the bottom of the scoop. The two walls 10 are offset longitudinally so that their inner vertical edges 10a are spaced by an aperture 10b which lies approximately in the zone of the longitudinal vertical plane. The width of the aperture 10b is made sufficient to allow passage of the largest seeds that are likely to be handled, and in one practical example, the gap is about 7 mm. It will be noted that in the embodiment shown, the walls 10 are inclined at an acute angle to the vertical longitudinal plane so that the edges 10a form the leading edges of the walls, although in an alternative arrangement the walls 10 could be perpendicular to the vertical longitudinal plane.

At the discharge end portion of the scoop, longitudinally offset barriers 12, which are similar to the barriers 10 but smaller are set into the base portion of the scoop to provide for final separation of the individual seeds prior to dispensing, so that the seeds are discharged singly, or in two's or three's at each vibration, the aperture defined between the barriers 12 being similar to that of the aperture 10a. Alternatively, one or more small transverse barriers over which the seeds jump may be incorporated in the bottom of the scoop at the discharge end portion as described in British Patent Specifiction No. 1,578,529.

Figure 2:
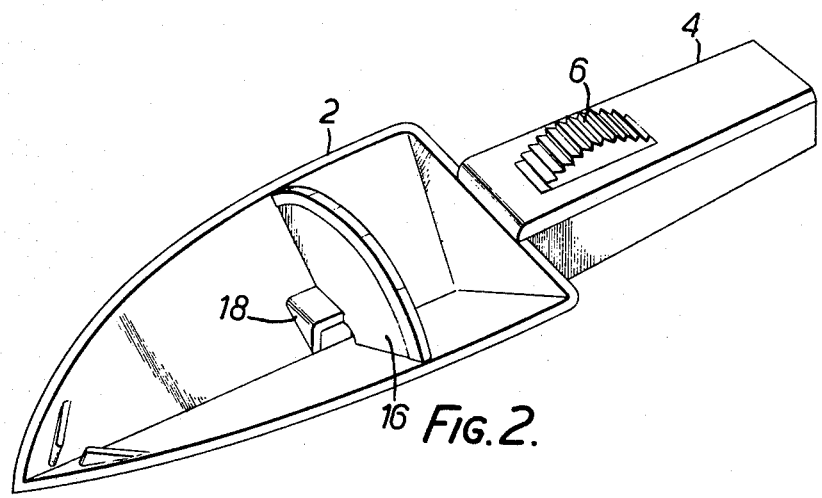
FIG. 2 is a perspective view of a second embodiment of a seed dispenser in accordance with the invention.
Figure 3:
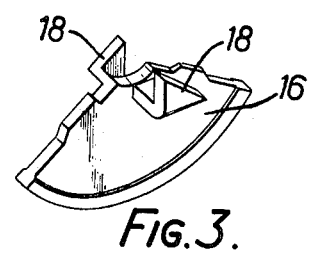
FIG. 3 is an inverted perspective view of a barrier panel used in the dispenser of FIG. 2.

The embodiment of FIGS. 2 and 3 is similar to that of FIG. 1 except that instead of using separate offset walls to retard the flow of seeds from the reservoir or supply there is provided a quadrant-shaped panel 16 with an aperture at its apex which lies in the zone of the bottom of the scoop. An L-sectioned wall 18 is formed on each of the two opposite faces of the panel 16 with each side of the two walls extending inwardly from a different side of the scoop to terminate at a position on, or closely adjacent to the central vertical plane of the scoop and thus to define an aperture, which is similar to the aperture 10a of FIG. 1 and which extends transversely of the general direction of inclination of the scoop when in use.

From the foregoing description it will be apparent that in both embodiments of the invention there is an upstream labyrinth-like barrier behind which the reservoir or supply of seeds is held and which permits controlled flow of seeds from the reservoir over a wide range of angles at which the dispenser is likely to be held in use. The outlet aperture from the labyrinth faces transversely of the general dirction of flow through the scoop and the labyrinth barrier is effective to control the flow of large and small size seeds. It is to be noted that the inner edges of the walls forming the labyrinth may be aligned exactly on a central vertical plane passing through the scoop or the edges may be slightly-overlapped.

I claim:

1. A hand tool for dispensing particulate matter including
   a scoop comprising a handle and a housing having a discharge end,
   a labyrinth barrier disposed transversely across the housing defining an upstream reservoir in the housing for particulate matter and defining a labyrinth path for particulate matter from the reservoir to the discharge end of the housing, said barrier comprising
      an apertured panel having on each face thereof a wall portion, said portions together with the apertured panel defining said labyrinth passage,
   means for vibrating the contents of the reservoir, and
   means adjacent the discharge end of the scoop for separating the particulate matter prior to discharge.

2. A hand tool according to claim 1, wherein the separating means comprises a pair of upstanding walls extending from the housing adjacent said discharge end and having edges terminating on or closely adjacent a central longitudinal vertical plane dividing the scoop, the edges of the walls being offset with respect to one another to define a path therebetween.

3. A hand tool according to claim 1, wherein the separating means comprises at least one transverse barrier disposed across the housing adjacent the discharge end.

4. A hand tool for dispensing seeds including
   a V-section housing defining a seed reservoir portion and a discharge end portion,
   a barrier separating seed reservoir portion and defining a labyrinth path therethrough adapted to pass seeds singly or in small groups upon agitation of the seeds in the reservoir, said barrier including
      a quadrant-shaped panel with the rectilinear edges thereof being secured to respective internal faces of the V-section housing and with an aperture co-incident with the apex of the V-section,
      a first L-sectioned wall mounted on the side of the panel partly defining the reservoir portion and on one internal face of the V-section housing, one edge of the L-section wall lying substantially in the plane bisecting the angle of the apex of the housing V-section and
      a second L-sectioned wall mounted on the side of the panel partly defining the discharge end portion and on the other internal face of the V-section housing, one edge of the L-sectioned wall lying substantially in the plane bisecting the angle of the apex of the housing V-section,
   said walls and the aperture together defining a labyrinth to control discharge from the reservoir, and
   a further barrier in the discharge end portion for further separating the seed immediately prior to discharge from the tool.

* * * * *